US008953012B2

(12) United States Patent
Williams et al.

(10) Patent No.: US 8,953,012 B2
(45) Date of Patent: Feb. 10, 2015

(54) MULTI-PLENOPTIC SYSTEM WITH IMAGE STACKING AND METHOD FOR WIDE FIELD-OF-REGARD HIGH-RESOLUTION IMAGING

(75) Inventors: Darin Williams, Tucson, AZ (US); Kent P. Pflibsen, Tucson, AZ (US); Marc Berte, Ashburn, VA (US)

(73) Assignee: Raytheon Company, Waltham, MA (US)

( * ) Notice: Subject to any disclaimer, the term of this patent is extended or adjusted under 35 U.S.C. 154(b) by 368 days.

(21) Appl. No.: 13/371,984

(22) Filed: Feb. 13, 2012

(65) Prior Publication Data

US 2013/0208082 A1 Aug. 15, 2013

(51) Int. Cl.
H04N 7/00 (2011.01)
(52) U.S. Cl.
USPC .......................................................... 348/36
(58) Field of Classification Search
USPC .......................................................... 348/36
See application file for complete search history.

(56) References Cited

U.S. PATENT DOCUMENTS

| 5,319,629 | A  | * | 6/1994  | Henshaw et al. ............. 369/103 |
| 5,504,597 | A  | * | 4/1996  | Sprague et al. ................. 349/57 |
| 6,333,826 | B1 | * | 12/2001 | Charles ........................... 359/725 |
| 6,476,805 | B1 | * | 11/2002 | Shum et al. .................... 345/420 |
| 7,382,465 | B1 | * | 6/2008  | Pepper ............................ 356/485 |
| 7,620,309 | B2 |   | 11/2009 | Georgiev |
| 7,773,116 | B1 | * | 8/2010  | Stevens ....................... 348/208.4 |
| 2002/0012071 | A1 | * | 1/2002 | Sun ................................ 348/578 |
| 2004/0031906 | A1 | * | 2/2004 | Glecker ..................... 250/208.1 |
| 2005/0270528 | A1 | * | 12/2005 | Geshwind et al. ............ 356/330 |
| 2006/0038994 | A1 | * | 2/2006 | Chrisp et al. .................. 356/328 |
| 2010/0013927 | A1 | * | 1/2010 | Nixon ............................ 348/144 |
| 2010/0292868 | A1 | * | 11/2010 | Rotem et al. ....................... 701/2 |
| 2011/0025870 | A1 |   | 2/2011 | Baraniuk et al. |

(Continued)

FOREIGN PATENT DOCUMENTS

WO WO-2013122669 A1 8/2013

OTHER PUBLICATIONS

Jacobson. "International Space Station Remote Sensing Pointing Analysis." In Proceedings of the 2007 IEEE Aerospace Conference [online]. Retrieved from the Internet ,URL:http://etd.fcla.edu/CF/CFE0000855/Jacobson_Craig_A_200512_MA.pdf> entire document, especially Abstract; p. 26 to p. 27.*

(Continued)

*Primary Examiner* — Richard Torrente
(74) *Attorney, Agent, or Firm* — Schwegman Lundberg & Woessner, P.A.

(57) ABSTRACT

Embodiments of a multi-plenoptic system with image stacking and method for wide field-of-regard (FOR) high-resolution image are generally described herein. The multi-plenoptic system may include a subfield separator to decompose an image within a wide field of view into a plurality of multi-pixel subfields. The subfield separator may rotate a chief ray within each multi-pixel subfield by a differing amount relative to a rotation of other rays of the subfield. The multi-plenoptic system may also include a subfield modulator to selectively block or pass light from at least a portion of one or more of the subfields and a subfield image formation element to relay the portions of the subfields that are passed by the subfield modulator onto substantially overlapping areas of a common image plane. A single focal-plane array (FPA) may be aligned with the common image plane to provide for high-resolution imaging over a wide FOR.

24 Claims, 2 Drawing Sheets

(56) References Cited

U.S. PATENT DOCUMENTS

2011/0273609 A1* 11/2011 DiFrancesco et al. ........ 348/345
2012/0019529 A1 1/2012 Kimpe
2012/0050562 A1 3/2012 Perwass et al.
2013/0107274 A1* 5/2013 Vertikov et al. ............... 356/479

OTHER PUBLICATIONS

"International Application Serial No. PCT/US2012/069219, International Search Report mailed Feb. 19, 2013", 4 pgs.

"International Application Serial No. PCT/US2012/069219, Written Opinion mailed Feb. 19, 2013", 6 pgs.

Jacobson, C. A., "International Space Station Remote Sensing Pointing Analysis", *2007 IEEE Aerospace Conference*, (2007), 1-13.

Jacobson, C. A., "International Space Station Remote Sensing Pointing Analysis", Thesis, Department of Mechanical, Materials, and Aerospace Engineering, University of Central Florida, Orlando, FL, [online] Retrieved from the Internet: <URL:http://etd.fcla.edu/CF/CFE0000855/Jacobson_Craig_A_200512_MA.pdf>, (2005), 65 pgs.

Ashok, Amit, et al., "Compressive light-field imaging", Electronic Imaging & Signal Processing, (Aug. 19, 2010), 12 pgs.

Coissart, Oliver S, et al., "Gigapixel Computational Imaging", IEEE International Conference on Computational Photography (ICCP), (Mar. 2011), 8 pgs.

Duarte, Marco, et al., "Single-Pixel Imaging via Compressive Sampling", IEEE Signal Processing Magazine, 83, (Mar. 2008), 9 pgs.

Kitamura, Yashiro, et al., "Reconstruction of a High-Resolution Image on a Compound-Eye Image-Capturing System", Applied Optics, vol. 43, Issue 8, pp. 1719-1727, (2004), 1719-1727.

Levin, Anat, et al., "Motion-invariant photography", ACM Transactions on Graphics (TOG)—Proceedings of ACM SIGGRAPH 2008 TOG Homepage vol. 27 Issue 3, (Aug. 2008), 9 pgs.

Takhar, Dharmpal, et al., "A new compressive imaging camera architecture using optical-domain compression", in Proc. of Computational Imaging IV at SPIE Electronic Imaging, (Jan. 2006), 10 pgs.

* cited by examiner

MULTI-PLENOPTIC SYSTEM WITH IMAGE STACKING AND METHOD FOR WIDE FIELD-OF-REGARD HIGH-RESOLUTION IMAGING

GOVERNMENT RIGHTS

This invention was not made with United States Government support. The United States Government does not have certain rights in this invention.

TECHNICAL FIELD

Embodiments pertain to optical systems. Some embodiments relate to multi-plenoptic systems. Some embodiments relate to cameras with electronic steering and zoom. Some embodiments relate to wide field-of-regard (FOR) high-resolution imaging.

BACKGROUND

One issue with conventional imaging systems the ability to image a large field-of-regard (FOR) at high resolution. Some conventional systems use a gimbaled seeker in which a gimbal moves a smaller high-resolution field-of-view (FOV) within a larger FOR. Some of these gimbaled systems may match scene motion to overcome smear and may isolate the image from the platform to reduce blur. Gimbals, however, are large, heavy and consume significant power and do not allow for simultaneous imaging of the entire FOR. Gimbals also are not generally suitable for extremely fast changes in line-of-sight (LOS) motion.

Some other conventional systems use ultra-large focal-plane arrays (FPAs) (e.g., greater than 35 mega-pixels (Mp). These FPAs are too large for many applications, are very expensive and do not address smear. Furthermore, the readout frame rate of many large FPAs may be insufficient for many high-frame rate, high-resolution, wide FOR applications. And, the complexity and cost of simultaneously focusing a large FOV on a single focal plane can be overwhelming. Providing adequate stabilization to limit smear becomes an increasing challenge in such systems, as do the challenges of off-FPA registration and processing via computational techniques to counter act the smear or obtain other resolution enhancement.

Thus, there are general needs for optical systems and methods for high-resolution imaging over a large FOR. What are also needed are optical systems and methods for high-resolution imaging that allow for simultaneous imaging of an entire large FOR. What are also needed are systems that can dynamically trade off FOV, resolution, frame rate, and sensitivity, systemically applying different trades in different areas at the same time. What are also needed are optical systems and methods for high-resolution imaging that reduce smear and minimize blur. What is also needed are optical systems for high-resolution large FOR imaging that are small, lightweight and do not consume significant power.

SUMMARY

In some embodiments, a multi-plenoptic system may decompose an image within a FOV into a plurality of multi-pixel subfields by rotation of a chief ray within each multi-pixel subfield by a differing amount relative to a rotation of other rays of the subfield. Light from at least a portion of one or more of the subfields may be selectively blocked or passed. Light from at least a portion of one of the subfields may be selectively modulated to provide for selection and a spatial-temporal encoding of the subfields. Portions of the subfields that are passed are relayed onto substantially overlapping areas of a common image plane.

In some embodiments, an optical system comprising optical elements and a controller is provided. The optical elements are configured to decompose an image within a FOV into a plurality of multi-pixel subfields by rotation of a chief ray within each multi-pixel subfield by a differing amount relative to a rotation of other rays of the subfield. The controller may cause the optical elements to selectively block or pass light from at least a portion of one or more of the subfields and selectively modulate light from at least a portion of one of the subfields to provide for selection and a spatial-temporal encoding of the subfields. The optical elements may be configured to provide the portions of the subfields that are passed onto substantially overlapping areas of a common image plane In some embodiments, a method for operating a multi-plenoptic imager comprises decomposing an image within a FOV into a plurality of multi-pixel subfields by rotation of a chief ray within each multi-pixel subfield by a differing amount relative to a rotation of other rays of the subfield, selectively blocking or passing light from at least a portion of one or more of the subfields, and providing the portions of the subfields that are passed onto substantially overlapping areas of a common image plane.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
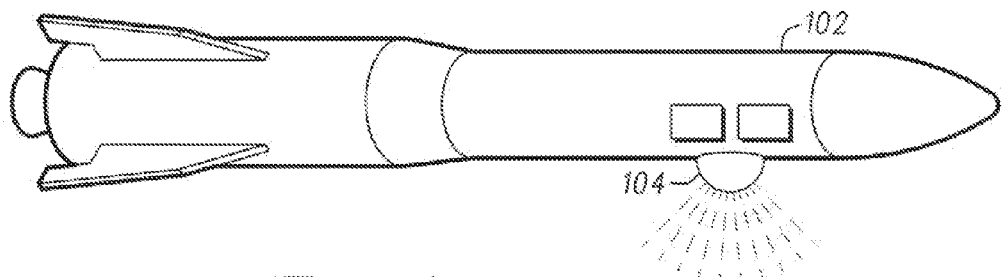
FIG. 1 illustrates a platform that includes a multi-plenoptic system in accordance with some embodiments.

FIG. 1 illustrates a platform that includes a multi-plenoptic system in accordance with some embodiments. Platform 102 may include multi-plenoptic system 104 suitable for high-resolution imaging over a large FOR. The multi-plenoptic system 104 may provide for simultaneous imaging of an entire large FOR that reduce smear and minimize blur. The multi-plenoptic system 104 is small, lightweight and may consume significantly less power that man conventional systems.

Platform 102 may comprise an airborne platform, a space-based platform, a mobile platform, or ground-based platform. Examples of airborne platforms include missiles in which the multi-plenoptic system 104 may be part of a missile seeker. Other examples of airborne platforms include aircraft including unmanned aerial vehicles (UAVs) such as drones. In some other embodiments, the multi-plenoptic system 104 may be suitable for use on man-carried or portable platforms, including suitable for use in a helmet-mounted sight. Embodiments of the multi-plenoptic system 104 may also be suitable for use in hand-held camera and image capture devices.

In accordance with embodiments, the multi-plenoptic system 104 may include a curved front lenslet array to break the input FOV (120°) into small overlapping sub-fields (i.e., one per lenslet) and images the overlapping sub-fields through a subfield alignment element onto separate non-overlapping areas of an intermediate image plane. The lenslet array may be position-actuated both laterally, allowing the whole set of images to be shifted across an image plane, and axially, allowing dynamic focus adjustment and modulation. A spatial polarization rotator (SPR) is provided at this image plane (i.e., the first plenoptic) and may be followed by a spatial light modulator (SLM). The SPR may be configured to selectively rotate the polarization of sub-areas within each sub-field, before the light passes into the SPR, allowing both polarimetry and added resolution. The SPR may programmatically mask all or selective portions of each lenslet field, allowing spatial, and temporal optical encoding. An intermediate image plane is re-imaged through a second lenslet array (i.e., the second plenoptic) so that each sub field may nominally fills an FPA. The FPA may be selected to provide a native resolution of 0.34 milli-radians (mr).

In some example embodiments, the multi-plenoptic system 104 may, for example, provide a continuously steerable 12° foveal FOV at native 0.34 mr resolution, across the entire 120° FOR, at >2× the FPA max full-frame rate, without significant computation and without moving parts. In these embodiments, the SLM may be used to select and window a single selected subfield).

In some example embodiments, the multi-plenoptic system 104 may, for example, provide electro-optical zoom at the same image format (pixels) and frame rate from 12° to the full 120°, using a parallel-binning readout. In these example embodiments, parallel-binning readouts may allow the readout frame rate for a fixed angular sized window (or for the entire FPA) to be increased by averaging a specified number of adjacent pixels before the readout. For example, averaging 2×2 groups of pixels may increase the readout frame rate by about four times. Unlike conventional digital zoom, the high resolution is native. That is, lower resolutions are achieved by averaging pixels, rather than achieving higher resolutions by interpolating between pixels. Other embodiments may be configured to boost the effective resolution still further.

In some example embodiments, the multi-plenoptic system 104 may, for example, provide ability to trade frame rate for a larger output format at a selected zoom.

In some example embodiments, the multi-plenoptic system 104 may, for example, provide for local blur/line-of-sight (LOS) motion compensation by using lenslet actuators to match the global shift/jitter, a concept that is almost universally overlooked in "gimbal-less" camera concepts.

In some example embodiments, the multi-plenoptic system 104 may, for example, provide an ability to trade resolution (0.1 mr or better) for frame rate and SNR by using the SLM to apply conventional computational optics techniques (e.g., optical encoding followed by computational decoding).

In some example embodiments, the multi-plenoptic system 104 may, for example, provide for the ability to improve SNR in multi-sub field images by temporally encoding and demodulating. This may help prevent the effective integration time from decreasing by "N", the number of subfields needed to cover the desired area.

In some example embodiments, the multi-plenoptic system 104 may, for example, provide for an ability to implement time/position optical encoding, which may be used to reduce smear local sensitivity.

In some example embodiments, the multi-plenoptic system 104 may, for example, provide an ability to implement focus encoding using spectral decomposition, field depth adjustment, and axial (3D) scene measurement. The multi-plenoptic system 104 of these embodiments may also be configured to computationally adjust the depth of field in resulting images.

In some example embodiments, the multi-plenoptic system 104 may, for example, provide an ability to extract features from the entire FOR using compressive sensing techniques (orthogonal codes on overlaid sub-fields).

In some example embodiments, the multi-plenoptic system 104 may, for example, provide an ability to "beat" SPR and SLM resolutions against each other for venire-scale resolution encoding on polarimetrically asymmetric image sources.

In some example embodiments, the multi-plenoptic system 104 may, for example, provide for flexible "time sharing" of these functions so foveal imaging can be maintained concurrently with full FOR situational awareness cueing and threat sensing. These embodiments are discussed in more detail below.

Figure 2:
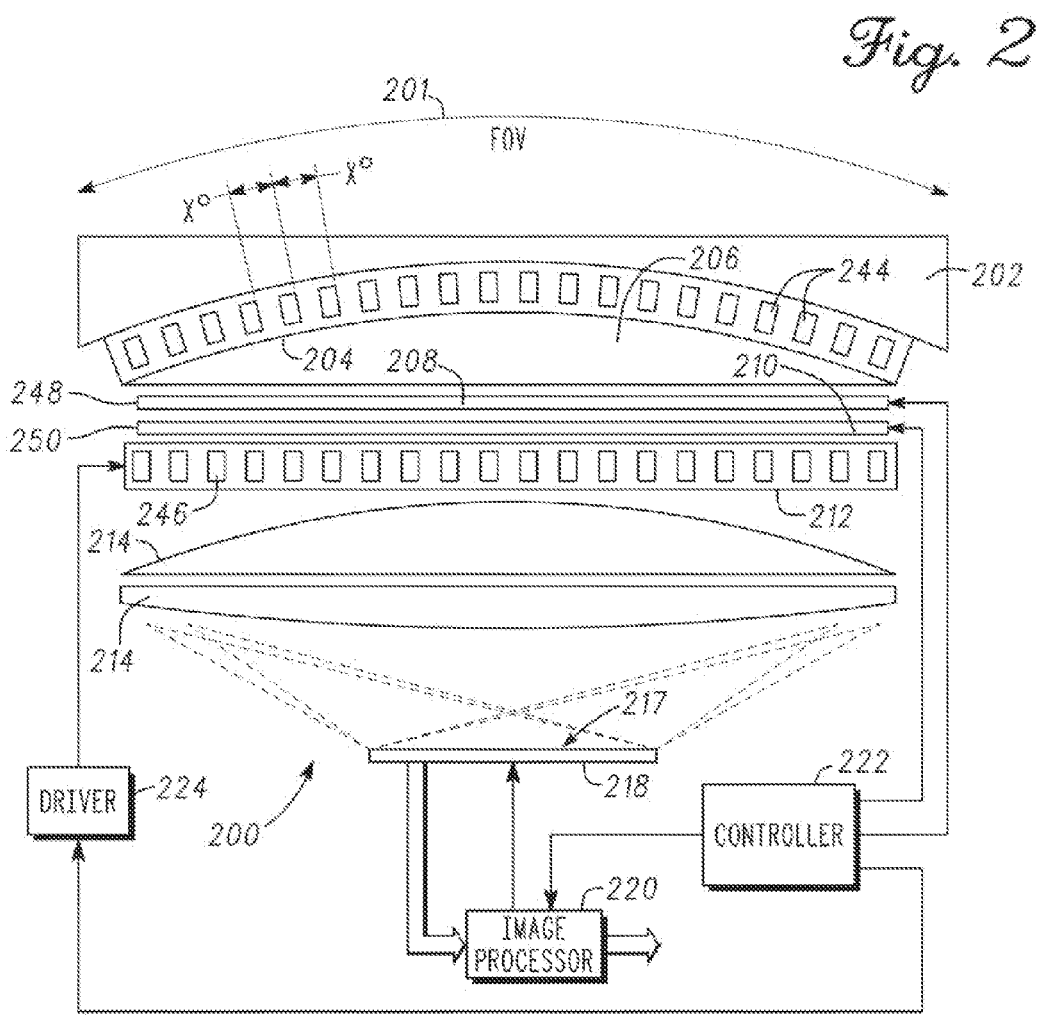
FIG. 2 is a functional diagram of a multi-plenoptic system in accordance with some embodiments.

FIG. 2 is a functional diagram of a multi-plenoptic system in accordance with some embodiments. The multi-plenoptic system 200 may be suitable for use as multi-plenoptic system 104 (FIG. 1) although other configurations may also be suitable. The multi-plenoptic system 200 may include a subfield separator 204 to decompose an image within a FOV 201 into a plurality of multi-pixel subfields by rotation of a chief ray within each multi-pixel subfield by a differing amount relative to a rotation of other rays of the subfield. This may be used to form separate images of different subfields on a light modulator, placed at an intermediate image plane. Separately focusing small sub fields proves to be a far easier optical challenge than focusing the entire field as a single image.

The multi-plenoptic system 200 may also include a subfield modulator 210 to selectively block or pass light from at least a portion of one or more of the subfields, and a subfield image formation element 212 to relay the portions of the subfields that are passed by the subfield modulator 210 onto substantially overlapping areas of a common image plane 217. The multi-plenoptic system 200 may also include a focal-plane array (FPA) 218 that is aligned with the common image plane 217. Accordingly, the multi-plenoptic system 200 may provide for high-resolution imaging over a large FOR.

In some embodiments, the multi-plenoptic system 200 may include a subfield alignment element 206 to compress an angle space of the chief rays of each of the subfields to provide a more-parallel alignment of the chief rays prior to subfield image formation by the subfield image formation element 212. The subfield alignment element 206 may be provided in the optical path before the subfield modulator 210. In other embodiments, the subfield alignment element 206 may be provided in the optical path after the subfield modulator 210.

In some embodiments, the subfield alignment element 206 may comprise a plurality of sub-elements. Each sub-element may be associated with either a single subfield or a group of subfields. In some embodiments, the subfield alignment element 206 may compress the angle space of the chief rays to provide an increased parallel alignment of the chief rays. After alignment of the chief rays, the chief rays may still not be quite parallel but are more fanned-in (i.e., thus compressing the angle space). As used herein, a chief ray may be the center ray of a subfield. The realignment of the chief rays of partially overlapping subfields to be more parallel may allow the chief rays to be provided more normally (i.e., more perpendicular) to the subfield modulator 210 for formation of a plenoptic image.

In some embodiments, the subfield modulator 210 may be a spatial-light modulator and comprises a plurality of spatial-light modulation (SLM) elements 250. Each spatial-light modulation element 250 may independently and selectively block or pass light from at least a portion of one of the subfields. In some embodiments, more than one spatial-light modulation element 250 may be provided for each subfield and each spatial-light modulation element 250 may independently and selectively block or pass light from a portion of one of the subfields. In some other embodiments, one spatial-light modulation element 250 may be provided for each subfield and each subfield spatial-light modulation element 250 may independently and selectively block or pass light from the associated subfield. In these other embodiments, there may a single spatial-light modulation element 250 is provided for each subfield. In some embodiments, the subfield modulator 210 may operate as a subfield selector and the spatial-light modulation elements 250 may operate as subfield selection elements.

In some embodiments, the subfield separator 204 may be placed in an optical path after the subfield modulator 210. The subfield separator 204 may select pixels for each subfield based on a pixel position in an output of subfield modulator 210. In some embodiments, a fore optic 202 may be provided to form the image on the subfield modulator 210. In these embodiments in which the subfield separator 204 is placed in an optical path after the subfield modulator 210, a subfield alignment element, such as the subfield alignment element 206, may not be needed.

In some embodiments, the subfield separator 204 may be provided in an optical path before the subfield modulator 210. In these embodiments, the subfield separator 204 may select pixels for each subfield based on angle of incoming rays of the image. A fore optic 202 may be included to collect and condition incoming rays to the subfield separator 204. In the example embodiments illustrated in FIG. 1, the subfield separator 204 is provided in an optical path before the subfield modulator 210. In some embodiments, the fore optic 202 may comprise one or more lenses.

In some embodiments, each spatial-light modulation element 250 of the subfield modulator 210 may be configured to selectively modulate light from at least a portion of one of the subfields to provide for selection and a spatial-temporal encoding of the subfields. In some embodiments, the subfield modulator 210 may be transmissive, while in other embodiments including some folded-optical path embodiments, the subfield modulator 210 may be reflective.

In some embodiments, more than one spatial-light modulation element 250 may be provided for each subfield to allow sub-areas of each subfield to be selected. These embodiments may provide for the selective blocking and/or selective transmission of sub-areas of the subfields. For example, over-bright or temporally inconsistent areas of a subfield may be blocked so as not to contaminate the subfield encoding described in more detail below. In these embodiments, over-bright or temporally inconsistent areas of a subfield may be identified and then blocked by configuring the spatial-light modulation elements 250 accordingly.

In some embodiments, one or more of the spatial-light modulation elements 250 may be configured to select portions of a subfield of one of the lenslets 244. In these embodiments, each spatial-light modulation element 250, when selected, may be configured to allow light to pass, or when not selected, not allow light to pass (i.e., to mask a portion of a subfield). The light of the selected spatial-light modulation element 250 may also be modulated with a spatial/temporal modulation, which may be unique to each spatial-light modulation element 250 for use in separating the subimages as described in more detail below.

In some embodiments, the multi-plenoptic system 200 may include a spatial polarity rotator (SPR) 208 comprising one or more controllable polarity rotation elements 248. Each polarity rotation element 248 may be configured to selectively rotate the polarity of some of the realigned rays from the subfield-alignment element 206. The spatial polarity rotator 208 may be provided in the optical path between the subfield-alignment element 206 and the subfield modulator 210, although this is not a requirement as the spatial polarity rotator 208 may be provided in other locations of the optical path. In some of these embodiments, polarity analysis may be performed time sequentially with a single polarity rotating element 248. By sequentially encoding the polarization analysis over time, and/or spatially encoding it across overlapping sub-field regions, information may be provided to separately decode the scene amplitude and polarization.

The multi-plenoptic system 200 may also include an objective lens to gather light from within the FOV 201, and a condensing lens set 214 to stack collimated images provided by the subfield image formation element 212 onto the substantially overlapping areas of the common image plane 217. In these embodiments, the subfield image formation element 212 may operate as a collimating element to collimate the images from the subfields and form an intermediate aperture. The objective lens is optional and may be part of the fore optic 202.

In some embodiments, multi-plenoptic system 200 may be a wide FOV optical system with electronic steering. In some other embodiments, multi-plenoptic system 200 may be a wide FOV optical system with electronic steering and zoom. In some embodiments, multi-plenoptic system 200 may be a multi-plenoptic optical system. The embodiments are discussed in more detail below.

In some embodiments, the subfield separator 204 may comprise a first set of lenslets 244. Each lenslet 244 may decompose a portion of the image into one of the multi-pixel subfields. The subfield image formation element 212 may comprise a second set of lenslets 246 to collimate images from the subfields.

In some embodiments, the lenslets of at least one of the first and second set comprise Gradient Index Nano-Composite (GRIN) rods although this is not a requirement. The subfield-alignment element 206 may comprise a plurality of achromatic prisms. Each achromatic prism may be associated with one of the lenslets 244 of the first set.

In embodiments that use GRIN rods, the GRIN rods may comprise glass cylinders having a graded index of refraction within the rod to control the bending of light rays. This is unlike a more conventional lens in which the surface shape of the lens controls the bending of the light rays. In some alternate embodiments, the lenslets 244 of the first set may be conventional lenses.

In some embodiments, the achromatic prisms of the subfield-alignment element 206 may be provided behind the lenslets 244 and may realign the chief rays of the different subfields to be more nominal to the SPR 208. This realignment may cause the different subfield images (one from each subfield) to overlay substantially on top of each other when focused on the common image plane 217. In some embodiments, the subfield-alignment element 206 may be a subfield-alignment lens.

In some embodiments, each lenslet 244 of the first set may be configured to gather light rays from a predetermined portion of the FOV 201. Each of the lenslets 244 may have at least partially overlapping subfields. In one example embodiment, the FOV 201 may be approximately 120 degrees and each lenslet 244 of the first set may be configured to gather light rays from a twenty-degree subfield FOV. In this example embodiment, a six-degree spacing between each of the lenslets 244 and a twenty-degree subfield FOV may provide fourteen-degrees of overlap among the subfields, although the scope of the embodiments is not limited in this respect. In some embodiments that use a 20×20 array of lenslets 244, four-hundred partially overlapping subfields may be provided.

In some embodiments, the objective lens may gather collimated light, which may be pre-conditioned before reaching the lenslets 244. The objective lens, the lenslets 244 and the subfield-alignment element 206 may be configured to form an intermediate image at the plane of the subfield modulator 210. In this way, the subfield modulator 210 may be configured to select areas by position in the FOV 201. The subfield-alignment element 206 may primarily realign the chief rays, while the objective lens and the lenslets 244 may operate to focus and help cancel any chromatic aberrations. The intermediate image at the subfield modulator 210 may be nominally collimated to an intermediate pupil by the second set of lenslets 246 of the subfield image formation element 212 (as the beams from the individual lenslets 244 of the subfield separator 204 may be more parallel). The lenses of the condensing lens set 214 may help correct any chromatic aberrations and refocus these co-aligned and collimated beams onto the common image plane 217 for acquisition by the FPA 218.

In some embodiments, the subfield-alignment element 206 may operate as a field lens that sits near the intermediate image plane and may perform little or no focusing to align the chief rays of the different subfields. In some embodiments, the subfield-alignment element 206 may comprise a single lens, however this is not a requirement. As discussed above, rather than a single lens, achromatic prisms may be used for the subfield-alignment element 206 in alternate embodiments. Due to the operation of the subfield-alignment element 206, which may angle or tilt the chief rays (compressing the angle space of the chief rays), the subfields may be projected onto non-overlapping areas of the intermediate image plane between the subfield-alignment element 206 and either the SPR 208 or the subfield modulator 210. In some of these embodiments, the subfield-alignment element 206 may operate as a field flattener.

In some embodiments, each polarity rotation element 248 of the SPR 208 may be configurable to receive light rays of a single associated subfield, although this is not a requirement. In other embodiments, each polarity rotation element 248 may receive light rays from more than one subfield (i.e., the number of polarity rotation element 248 may be less than the number of subfields). In other embodiments, each polarity rotation element 248 may receive light rays from less than one subfield (i.e., the number of polarity rotation element 248 may be more than the number of subfields). The number of polarity rotation elements 248 may depend on the degree of control desired. In some embodiments, a number of polarity rotation elements 248 that may be provided for each lenslet 244 to enhance resolution by Vernier-caliper (Morier) type effects beating against the spatial polarity rotator resolution, although this is not a requirement.

In some embodiments, the spatial polarity rotator 208 may receive a plenoptic image comprising a plurality of subimages in which each subimage is associated with a subfield that is provided by one of the lenslets 244. The polarity rotation elements 248 may be liquid crystal elements (e.g., spatial polarity rotator cells) in which the polarization rotation may be electrically controlled between two polarizing elements. When a cell is activated, the polarization of the incident light may be rotated so that what passes the input polarizer is aligned with the output polarizer to pass the light. When a cell is deactivated, the liquid crystals may be configured to rotate the polarization 180 degrees to block the light. Other spatial polarity rotator configurations may also be suitable.

In some embodiments, the spatial polarity rotator 208 and the subfield modulator 210 may together comprise a single 3-sheet glass stack in which the middle glass sheet serves as both the back of the SPR 208 and the front of the subfield modulator 210. In other embodiments, the optical path may be folded to allow for the use of a reflective subfield modulator, such as a digital micro-mirror array. In some embodiments, each polarity rotation element 248 of the spatial polarity rotator 208 may operate as a 180×180 polarity rotator in which each element 248 is configurable to rotate the polarity of the light of an associated subfield up to +/−180 degrees or more, although the scope of the embodiments is not limited in this respect.

In some embodiments, the lenslets 246 of the second set of lenslets may collimate images of the different subfields forming an intermediate aperture before the condensing lens set 214. To the first order, where light rays entering an aperture are focused on the FPA 218 depends on the direction at which the rays enter the aperture rather than on the position where they enter. In these embodiments, the images from each lenslet 246 may be collimated so that their chief rays nominally line up. The condensing lens set 214 may focuses the lenslet images on the common image plane 217 of the FPA 218. In this way, the condensing lens set 214 condenses and projects the light rays of each subfield substantially across the entire FPA 218 allowing the subfields from each of the lenslets 246 to substantially overlap on the same portion of the FPA 218.

In some embodiments, the second set of lenslets 246 may be arranged in a plane as illustrated in FIG. 2. The first set of lenslets 244 may be arranged between a convex surface of the subfield-alignment element 206 and a concave surface of the objective lens 202. In these embodiments, the spatial polarity rotator 208 and the subfield modulator 210 may be planar elements.

In some embodiments, the multi-plenoptic system 200 may also include a controller 222 to control the operation of the various elements of the multi-plenoptic system 200. The multi-plenoptic system 200 may also include an image processor 220 process a subfield image at the common image plane 217 that is captured by the FPA 218. The controller 222 may be implemented in one or a combination of hardware, firmware and software and may include instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the controller 222 may include one or more processors and may be configured with instructions stored on a computer-readable storage device In some embodiments, the controller 222 may configure a selected spatial-light modulation element 250 to apply a temporal light modulation sequence to light rays of an associated sub-area of a subfield. In these embodiments, a different temporal light modulation sequence may be applied to each selected spatial-light modulation element 250. The temporal light modulation sequences may be a non-collinear modulation (i.e., having some orthogonal components). In some embodiments, codes that are substantially orthogonal (after removing DC components) may be used. In some embodiments, only the light rays of a subfield associated with one or more of the selected spatial-light modulation elements 250 may be passed to the second set of lenslets 246.

In some embodiments, the multi-plenoptic system 200 may also include a driver, such as a two degrees-of-freedom (2DoF) driver or a three degrees-of-freedom (3DoF) driver, to move one or more optical elements of the multi-plenoptic system 200 with respect to the FPA 218 for image shifting (e.g., by moving in the cross-image, or x-y directions) and (optionally) image focus (e.g., by moving in perpendicular, or z, direction). In these embodiments, the driver 224 may comprise a plurality of actuators that may be controlled by the controller 222. In some alternate embodiments, the FPA 218 may be moved.

In some embodiments, a roll actuator may also be included to roll the image about the field axis. In some embodiments, an additional element, such as a dove Prism, may be placed in the optical path for roll actuation. In some embodiments, the FPA 218 may be rotated.

In some embodiments, actuators may be provided on the lenslet array to provide global shift and/or focus matching and encoding for each subfield, although this is not a requirement. Alternatively, a reflective device and a folded reimaging path in place of the subfield modulator 210 may be used or a steering mirror in place of an actuated lens may be used.

In some embodiments, focus matching may be employed for auto-focus adjustment or for encoding focus information to support focus adjustment in processing. A temporally encoded stream with different focus values may be used to provide information about the difference in focus of different portions of the image. These embodiments are discussed in more detail below.

In some embodiments, the controller 222 may control the polarity rotation of the polarity rotation elements 248 of the SPR 208 for subfield selection and control the SLM elements 250 of the subfield modulator 210 for sub-area selection of the subfields. In some embodiments, the images in the FOV 201 may be identified based on polarity of reflected light by controlling the polarity rotation. In these embodiments, the SPR 208 supports polarimetry by allowing the image processing circuitry 220 to measure and interpret the polarization of the received light within each subfield. Accordingly, man-made targets (which generally reflect polarized light) may be distinguished from natural targets (which generally reflect non-polarized light) in the FOV 201.

In some embodiments, the multi-plenoptic system may include a plurality of optical front-ends. Each optical front-end may be associated with one of a plurality of spatially separated input apertures. Each front-end may collect light from one of a plurality of spatially separated input apertures. The subfield image formation element 212 may be configured to combine light (either coherently or non-coherently) from the portions of the subfields from each front-end onto substantially overlapping areas of the common image plane 217.

In these multi-front-end embodiments, each front end may include one spatially separated input aperture. The separate light collected from each front end may be combined onto the FPA 218. The spatially separate input apertures may have a spacing therebetween greater than the aperture size. Each front end may also include a subfield separator, such as subfield separator 204 and a subfield modulator, such as subfield modulator 210. In some embodiments, to enhance the optical (diffraction limited) resolution, the subfield image formation element 212 may coherently combine light from each front-end at the image plane. In embodiments in which the subfield image formation element 212 coherently combines light from the portions of the subfields, a common input wavefront phase is maintained which may result in signal gain of roughly "N", the number of input apertures, which may range from two to ten or more. Coherent combining may increase the effective diffraction limit according to the spacing between the combined apertures. For example, if the collection aperture for a single lenslet is 0.1 cm, the diffraction limited spatial resolution is proportional to 0.1 cm/L where L is the wavelength of the captured light. Combining three or more front ends may provide for the simultaneously extending the diffraction limited resolution in both axes. In other embodiments, to simply capture more photons and produce a signal gain on the order of the square-root of N for N front-ends, coherent combining is not required.

In some embodiments, the multi-plenoptic system 200 may operate in at least one of a native steering mode, a native zoom mode, an encoded zoom mode, a plenoptic super-sampling mode, a temporal super-sampling mode, and image stabilization mode, a micro back-scan mode, a variable format mode and a mixed mode. These embodiments are discussed in more detail below.

Figure 3:
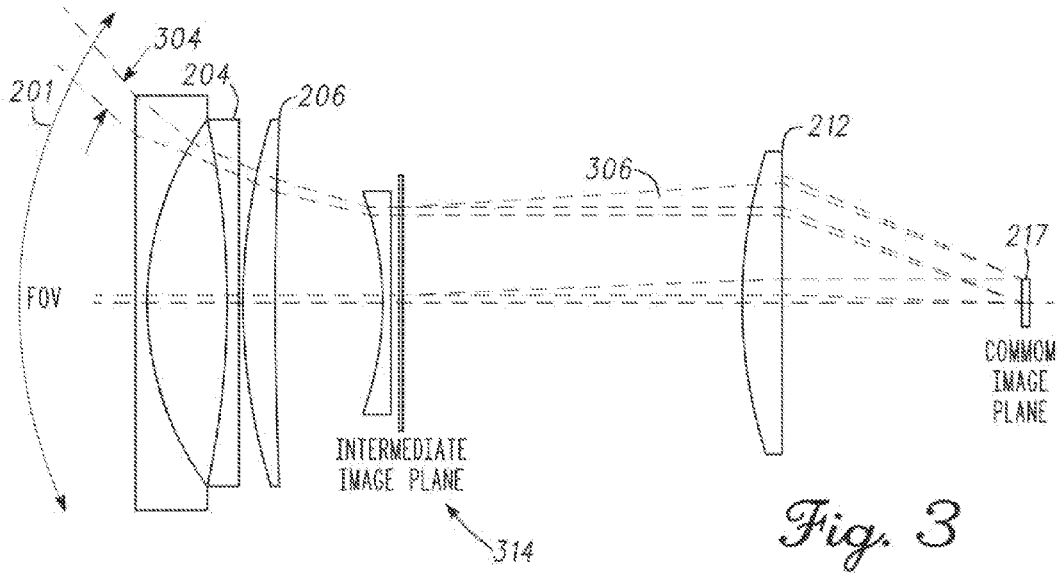
FIG. 3 is a ray-trace diagram illustrating the operation of a multi-plenoptic system in accordance with some embodiments.

FIG. 3 is a ray-trace diagram illustrating the operation of a multi-plenoptic system in accordance with some embodiments. As illustrated, the subfield separator 204 decomposes an image within the FOV 201 into a plurality of multi-pixel subfields 304. The subfield alignment element 206 compresses an angle space of the chief rays of each of the subfields prior to subfield image formation at an intermediate image plane 314 (the intermediate image plane). The subfield image formation element 212 (FIG. 2) may relay the portions 306 of the subfields that are passed by the subfield modulator 210 (FIG. 2) onto substantially overlapping areas of a common image plane 217. Traces are shown in FIG. 3 are shown only for the central and outer-edge field points of the two-sub fields. The opposite edge field point fills out to the other side of the FPA.

Figure 4:
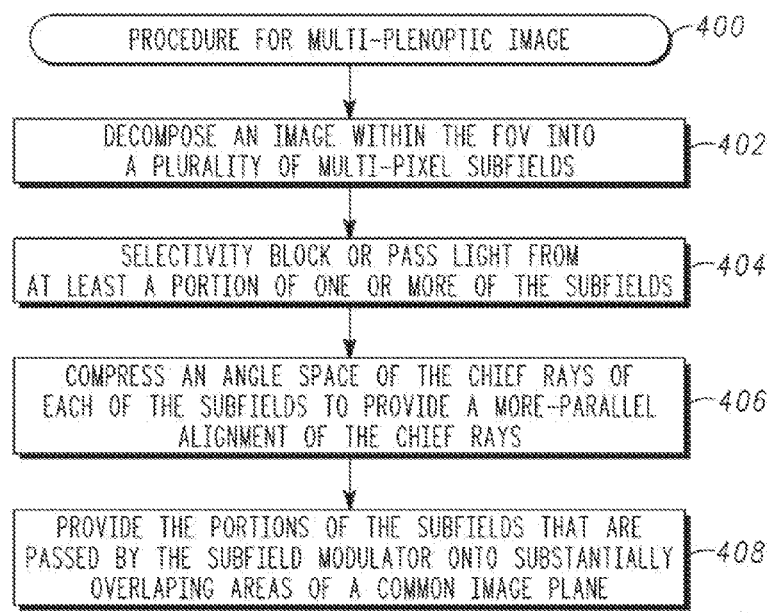
FIG. 4 is procedure for multi-plenoptic imaging in accordance with some embodiments.

FIG. 4 is procedure for multi-plenoptic imaging in accordance with some embodiments. Procedure 400 may be performed by a multi-plenoptic system such as multi-plenoptic system 200 (FIG. 2), although other system configurations may also be suitable.

In operation 402, an image within a FOV is decomposed into a plurality of multi-pixel subfields. In some embodiments, a subfield separator, such as subfield separator 204 (FIG. 2), may decompose an image within the FOV 201 (FIG. 2) into a plurality of multi-pixel subfields by rotation of a chief ray within each multi-pixel subfield by a differing amount relative to a rotation of other rays of the subfield.

In operation 404, light from at least a portion of one or more of the subfields is selectively blocked or passed. Operation 404 may be performed by a subfield modulator, such as subfield modulator 210 (FIG. 1).

In operation 406, the angle space of the chief rays of each of the subfields may be compressed. This may provide a more-parallel alignment of the chief rays prior to subfield image formation. Operation 406 may be performed by a subfield alignment element, such as subfield alignment element 206 (FIG. 2). In embodiments in which the subfield separator 204 is placed in an optical path after the subfield modulator 210, a subfield alignment element, may not be needed.

In operation 408, portions of the subfields that are passed by the subfield modulator are relayed onto substantially overlapping areas of a common image plane. Operation 408 may be performed by the subfield image formation element 212 (FIG. 2) which may relay the portions of the subfields onto substantially overlapping areas of a common image plane 217 (FIG. 2).

As discussed above, the multi-plenoptic system 200 may operate in a native steering mode. During the native steering mode, the controller 222 configures the subfield modulator 210 to pass light from a selected subfield and blocks light from other subfields and configures the FPA 218 to provide either a windowed readout of a portion of the selected subfield or a non-windowed readout of the entire selected subfield. The native steering mode allows for steering of a FOV (the size of the subfield overlap region) within the overall system FOV 201 without significant computations. The controller 222 may configures the SLM elements 250 of the subfield modulator 210 to pass light rays from a subfield pointing most closely in a desired direction and to block light rays from the other subfields. A windowed readout in the FPA 218 may be provided to read-out the portion of that subfield pointing the desired direction, so that time is not wasted reading out pixels that are outside the desired area. This approach allows a smaller area to be read out at higher frame rates. In some alternate embodiments, the entire subfield may be read-out and the windowing may be done off the FPA 218. In some embodiments, the actuators of a 3DoF driver may be configured by the controller 222 to move the line-of sight to adjust for a fractional-pixel motion.

As discussed above, the multi-plenoptic system 200 may also operate in a native zoom mode. During the native zoom mode, the controller 222 configures the subfield modulator 210 to select subfields, one subfield at a time at a frame rate, to pass light from the currently selected subfield and block light from currently non-selected subfields. The controller 222 may configure the FPA 218 to provide samples of portions of the selected subfields sequentially in time, which collectively images an area larger than a single sub-field. The native zoom mode may be used at multiples of the native pixel instantaneous FOV (IFOV) (1/resolution) which may keep the same number of pixels per image and same frame rate and may provide for a larger FOV and pixel IFOV. In these embodiments, each subfield FOV may be broken into portions that may be read out separately and reassembled. Binning may be performed in the detector readout to allow an N×N or N×M area of pixels to be averaged together and read out as one pixel, so that the data rate of the FPA 218 does not have to increase to cover a larger area. Alternatively, more pixels may be read out and the binning may be performed externally to the FPA 218 by image processing circuitry 220.

As discussed above, the multi-plenoptic system 200 may also operate in an encoded zoom mode. During the encoded zoom mode, the controller 222 configures the subfield modulator 210 to encode each subfield with a separable temporal code. The controller 222 also configures the FPA 218 to image multiple subfields simultaneously. The controller 222 also configures the image processing circuitry 220 to separate the subfields by demodulating the separable temporal codes to generate separate subfield images. A composite image may be constructed from these separately-generated subfield images. The encoded zoom mode may trade off better light collection for lower input dynamic range and more processing as compared to the native zoom mode. Rather than sampling the subfield portions sequentially in time, multiple areas may be simultaneously imaged onto the FPA 218 with separable temporal codes applied to each. The subfields may be separated by demodulating these codes. In the native zoom mode when N steps used to cover the desired FOV, the photon collection duty factor goes down to 1/N. In the encoded zoom mode, the duty factor may be as high as ½, where the different modulations determine which ½ of the time slices are "on" for any particular subfield.

As discussed above, the multi-plenoptic system 200 may also operate in a plenoptic super-sampling mode. During the plenoptic super-sampling mode, the controller 222 may configure the subfield modulator 210 to pass only the overlapping portions of selected subfields. The overlapping portions are displaced from each other on the FPA 218 forming separate images at different sub-pixel shifts. In these embodiments, plenoptic super sampling allows the multi-plenoptic system 200 to operate as a plenoptic imager in which the effective pixel resolution may be enhanced by simultaneously sampling and then processing multiple displaced copies of an image. These different sub-images may be at slightly different sub-pixel alignments to achieve super-sampling, which may be driven either by the optics arrangement or by separate x-y actuation of the subfields. This mode takes advantage of the overlap between subfields. A plurality of subfields that image a desired area may be passed simultaneously by the SLM elements 250, however in these embodiments, they are configured to pass only the common sub-area. Due to the subfield displacements in image space, these common image space areas are displaced from each other on the FPA 218 forming the separate images. An example embodiment may allow the simultaneous collection of a 3×3 array of images of a six degree square subfield in an overall area between nine subfields.

As discussed above, the multi-plenoptic system 200 may also operate in a temporal super-sampling mode. During the temporal super-sampling mode, the controller 222 may configure an actuator of a 3DoF driver for sub-pixel motion, and the image-processing circuitry 220 may process the resulting spatially interleaved images to provide a one or more composite images at an increased effective sampling density. In the temporal super-sampling mode, super sampling is achieved over time through sub-pixel motion of the actuator. For example, the actuator may be moved in a 2×2 grid of ½ pixel steps and the resulting images may then be interleaved to provide a single composite image at twice the effective sampling density. For example, four images with 512×512 pixels each may be used to form a single result image covering the same FOV but at 1024×1024 pixels sampling. Alternatively, the output image format and frame rate may be preserved providing ½ the FOV at twice the resolution. In these embodiments, the amount of oversampling is not limited to a factor of two, but may be greater that two and may be as great as ten or more.

As discussed above, the multi-plenoptic system 200 may also operate in an image stabilization mode. During the image stabilization mode, the controller 222 may configure an actuator of the driver 224 to null effective image motion across the FPA 218 during an integration time. In these embodiments, image smear that would otherwise be caused by instability of the imaging platform line of sight or object motion across image space may be removed without the use of a conventional gimbal system. In these embodiments, the actuator may be used to null the effective image motion across the FPA 218 during an integration time. The image stabilization mode may operate in conjunction with one or more other modes to provide image stabilizing.

As discussed above, the multi-plenoptic system 200 may also operate in a micro back-scan mode. During the micro back-scan mode, the controller 222 configures the image processing circuitry 220 to compensate for full-pixel steps of the actuators and to cause the FPA 218 to reset an integration time for each full-pixel step. In these embodiments, since the actuators have a limited range of motion, displacements in full-pixel steps may be compensated for electronically off the FPA 218. The stabilization system resets between integration times so that the image moves in full pixel steps. In the micro back-scan mode, optical and electronic image stabilization is combined. Unlike some conventional techniques, during micro back-scan mode, scene motion is followed without attempting to re-center the actuator limits during integration time. If the motion exceeds the actuator limits, than image capture is ended and the actuator may be reset (typically but not necessarily to near center) and the actuator is stepped in full pixel increments. After the actuator motion is complete, capture of a new frame may begin allowing the actuator to continuously compensate for continuous image motions. This may help assure that the two images, which may later to be added to enhance SNR, are shifted relative to each other in increments of a full pixel so that they can be combined without loss of fidelity. Accordingly, a multi-plenoptic camera is provided that operates in a micro-back scan mode.

In some embodiments, during micro back-scan mode, the controller 222 may be configured to follow LOS motion to reduce smear and to compensate in full-pixel steps between frames. This may allow for resetting of the actuators and to help bring the actuators closer to the center of their range. In some embodiments, during micro back-scan mode, the controller may further configure the image processing circuitry 220 for processing sub-pixel steps for resolution enhancement. In these embodiments, the controller 222 may configure the actuators to implement intentional, controlled sub-pixel steps.

In some alternate embodiments, intentional sub-pixel displacements may be used as in the temporal super-sampling mode. In some applications, this off-FPA frame summing may improve signal-to-noise ratio (SNR) without image smear resulting from mis-registration.

In the variable format mode, the frame rate, the number of pixels per frame, and image FOV may be dynamically varied. This mode may allow a trade-off between FOV and frame rate at a given resolution by combining more subfields and using all the pixels as in panorama camera or by using smaller windows at a higher rate to trade resolution (pixel sampling) for frame rate (as in temporal super sampling) or to trade sensitivity for FOV or frame rate.

When operating in a mixed mode, the system 200 may be configured for a wide variety of trade-offs. Different imaging modes may be combined in the same readout sequence. For example, a high frame rate super-sampling of selected sub areas may be performed while operating in the encoded zoom mode to provide wide area situation awareness and fovea-detailed examination at the same time. In some of these embodiments, angle displacement encoding may also be used to allow super-sampling for resolution enhancement.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-plenoptic system, comprising:
    a fore optic;
    a first set of lenslets configured to receive incoming rays from the fore optic and decompose an image within a field of view into a plurality of multi-pixel subfields by rotation of a chief ray within each multi-pixel subfield by a differing amount relative to a rotation of other rays of the subfield, the first set of lenslets configured to select pixels for each subfield based on angle of the incoming rays of the image;
    a spatial light modulator disposed in an optical path after the first set of lenslets, the spatial light modulator including a plurality of spatial light modulation elements, each spatial light modulation element configured to selectively modulate light from at least a portion of one of the subfields to provide for selection and a spatial-temporal encoding of the subfields;
    a second set of lenslets configured to relay the portions of the subfields that are passed by the spatial light modulator onto substantially overlapping areas of a common image plane; and
    a plurality of achromatic prisms configured to compress an angle space of the chief rays of each of the subfields to provide a more-parallel alignment of the chief rays prior to subfield image formation by the second set of lenslets.

2. The multi-plenoptic system of claim 1, further comprising one or more controllable liquid crystal elements, each liquid crystal element configured to selectively rotate a polarization of some of the realigned rays from the plurality of achromatic prisms.

3. The multi-plenoptic system of claim 1, further comprising:
    an objective lens to gather light from within the field of view; and
    a condensing lens set to stack collimated images provided by the second set of lenslets onto the substantially overlapping areas of the common image plane.

4. The multi-plenoptic system of claim 1, further comprising a plurality of optical front-ends, each associated with one of a plurality of spatially separated input apertures,
    wherein each front-end to collect light from one of a plurality of spatially separated input apertures, and
    wherein the second set of lenslets is configured to combine light from the portions of the subfields from each front-end onto substantially overlapping areas of the common image plane.

5. The multi-plenoptic system of claim 4 wherein the second set of lenslets is configured to coherently combine light from the portions of the subfields from each front-end onto substantially overlapping areas of the common image plane.

6. The multi-plenoptic system of claim 4 wherein the second set of lenslets is configured to combine light non-coherently from the portions of the subfields from each front-end onto substantially overlapping areas of the common image plane.

7. The multi-plenoptic system of claim 1, wherein the second set of lenslets is configured to collimate images from the subfields.

8. The multi-plenoptic system of claim 7 wherein the lenslets of at least one of the first and second set comprise Gradient Index Nano-Composite rods, and
    wherein each achromatic prism in the plurality is associated with one of the lenslets of the first set.

9. The multi-plenoptic system of claim 1, further comprising:
a focal plane array aligned with the common image plane;
a controller to configure a selected spatial light modulation element to apply a temporal light modulation sequence to light rays of an associated sub-area of a subfield; and
an image processor configured to process a subfield image at the common image plane that is captured by the focal plane array.

10. The multi-plenoptic system of claim 9 further comprising either a two degrees-of-freedom (2DoF) driver or a three degrees-of-freedom (3DoF) driver configured to move one or more optical elements of the multi-plenoptic system with respect to the focal plane array for image shifting and image focus.

11. The multi-plenoptic system of claim 10, wherein during a temporal super-sampling mode, the controller is configured to configure an actuator of the 3DoF driver for sub-pixel motion, and
wherein image-processing circuitry is configured to process resulting spatially interleaved images to provide one or more composite images at an increased effective sampling density.

12. The multi-plenoptic system of claim 11, wherein during a micro back-scan mode, the controller configures the image processing circuitry to compensate for full-pixel steps of the actuator and to cause the focal plane array to reset an integration time for each full-pixel step.

13. The multi-plenoptic system of claim 12 wherein the controller is configured to follow line of sight motion to reduce smear and to compensate in full-pixel steps between frames.

14. The multi-plenoptic system of claim 12 wherein the controller further configures the image processing circuitry for processing sub-pixel steps for resolution enhancement.

15. The multi-plenoptic system of claim 9 wherein during a native steering mode, the controller configures the spatial light modulator to pass light from a selected subfield and blocks light from other subfields and configures the focal plane array to provide either a windowed readout of a portion of the selected subfield or a non-windowed readout of the entire selected subfield.

16. The multi-plenoptic system of claim 9 wherein during a native zoom mode, the controller configures the spatial light modulator to select subfields one subfield at a time at a frame rate, to pass light from the currently selected subfield and block light from currently non-selected subfields, and
wherein the controller configures the focal plane array to provide samples of portions of the selected subfields sequentially in time, which collectively images an area larger than a single sub-field.

17. The multi-plenoptic system of claim 9 wherein during an encoded zoom mode, the controller configures the spatial light modulator to encode each subfield with a separable temporal code,
wherein the controller configures the focal plane array to image multiple subfields simultaneously, and
wherein the controller configures the image processing circuitry to separate the subfields by demodulating the separable temporal codes to generate separate subfield images and for reconstructing a composite image from the separately-generated subfield images.

18. The multi-plenoptic system of claim 9 wherein during a plenoptic super-sampling mode, the controller configures the spatial light modulator to pass overlapping portions of selected subfields, and
wherein the overlapping portions are displaced from each other on the focal plane array forming separate images at different sub-pixel shifts.

19. The multi-plenoptic system of claim 1, further comprising a field lens configured to compress an angle space of the chief rays of each of the subfields to provide a more-parallel alignment of the chief rays prior to subfield image formation by the second set of lenslets.

20. An optical system, comprising:
a fore optic;
a first set of lenslets configured to receive incoming rays from the fore optic and decompose an image within a field of view into a plurality of multi-pixel subfields by rotation of a chief ray within each multi-pixel subfield by a differing amount relative to a rotation of other rays of the subfield, the first set of lenslets configured to select pixels for each subfield based on angle of incoming rays of the image;
a spatial light modulator disposed in an optical path after the first set of lenslets, the spatial light modulator including a plurality of spatial light modulation elements;
a controller configured to cause the spatial light modulation elements to selectively block or pass light from at least a portion of one or more of the subfields and selectively modulate light from at least a portion of one of the subfields to provide for selection and a spatial-temporal encoding of the subfields;
a second set of lenslets configured to provide the portions of the subfields that are passed onto substantially overlapping areas of a common image plane; and
a plurality of achromatic prisms configured to compress an angle space of the chief rays of each of the subfields to provide a more-parallel alignment of the chief rays prior to subfield image formation by the second set of lenslets.

21. The optical system of claim 20 further comprising image processing circuitry and actuators, wherein during a micro back-scan mode, the controller configures the image processing circuitry to compensate for full-pixel steps of the actuators and to cause the focal plane array to reset an integration time for each full-pixel step.

22. The optical system of claim 20, further comprising a field lens configured to compress an angle space of the chief rays of each of the subfields to provide a more-parallel alignment of the chief rays prior to subfield image formation by the second set of lenslets.

23. A method for operating a multi-plenoptic imager comprising:
passing light from an image within a field of view through a first set of lenslets, the lenslets decomposing the image into a plurality of multi-pixel subfields by rotation of a chief ray within each multi-pixel subfield by a differing amount relative to a rotation of other rays of the subfield;
compressing an angle space of the chief rays of each of the subfields with a plurality of achromatic prisms to provide a more-parallel alignment of the chief rays;
independently and selectively blocking or passing light from at least a portion of one or more of the subfields;
selectively modulating light from at least a portion of one of the subfields to provide for selection and a spatial-temporal encoding of the subfields; and
providing the portions of the subfields that are passed onto substantially overlapping areas of a common image plane.

24. The method of claim 23 further comprising selectively rotating a polarization of at least some of the rays from the subfield.

* * * * *